Figure 1:
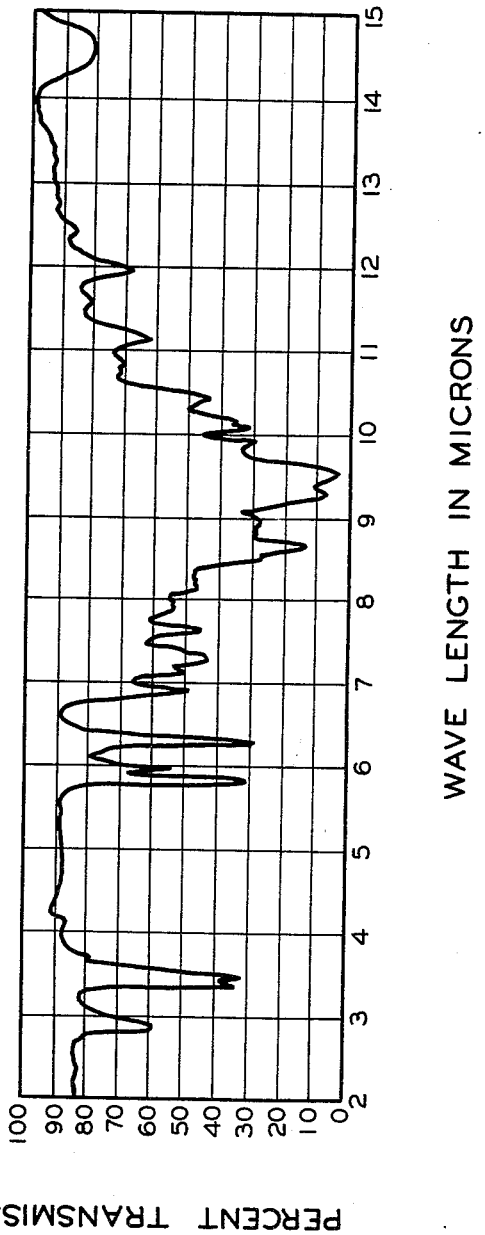
Figure 2:
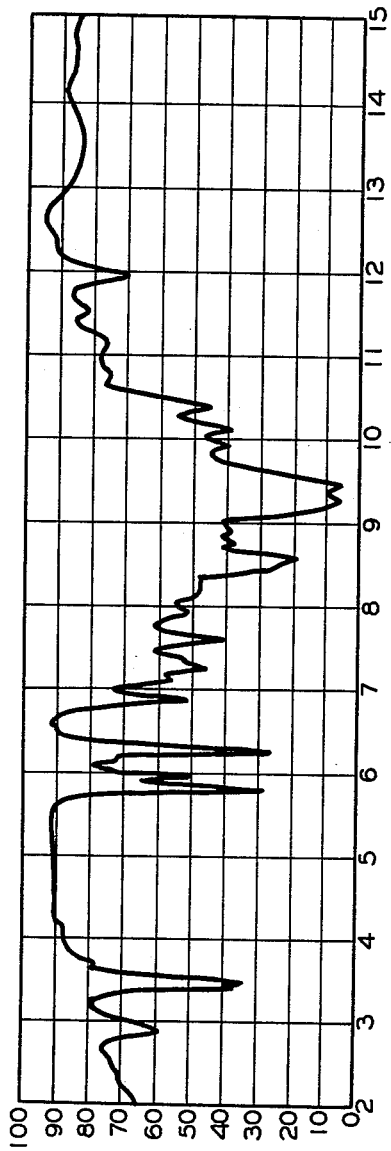

April 13, 1965     R. L. HAMILL ETAL     3,178,341
ANTIBIOTICS TYLOSIN AND DESMYCOSIN AND DERIVATIVES THEREOF
Filed June 27, 1960     2 Sheets-Sheet 1

INVENTORS
ROBERT L. HAMILL
MICHAEL E. HANEY, JR.
JAMES M. McGUIRE
MARTHA C. STAMPER

BY

ATTORNEY

INVENTORS
ROBERT L. HAMILL
MICHAEL E. HANEY, JR.
JAMES M. McGUIRE
MARTHA C. STAMPER

BY

ATTORNEY

United States Patent Office 3,178,341
Patented Apr. 13, 1965

3,178,341
ANTIBIOTICS TYLOSIN AND DESMYCOSIN AND DERIVATIVES THEREOF
Robert L. Hamill, Michael E. Haney, Jr., James M. McGuire, and Martha C. Stamper, all of Indianapolis, Ind., assignors to Eli Lilly and Company, Indianapolis, Ind., a corporation of Indiana
Filed June 27, 1960, Ser. No. 39,104
14 Claims. (Cl. 167—65)

This is a continuation-in-part of our copending U.S. patent aplication Serial No. 770,532, filed October 29, 1958, now abandoned.

This invention relates to novel organic compounds. More particularly, it relates to novel nitrogenous organic compounds and to processes for their preparation.

By this invention there are provided novel organic bases which are referred to herein as tylosin and desmycosin and which in our said copending application were referred to as HM2724 and HM2724B, respectively.

The novel bases have closely related chemical, pharmacological, and antimicrobial properties. Tylosin and desmycosin can both be acylated to provide esters. Both tylosin and desmycosin as well as their acyl derivatives or esters, are basic compounds which when treated with acids are converted to acid addition salts.

Tylosin, a nitrogenous base is a white solid which crystallizes readily in the form of small plates from a number of solvents such as aqueous acetone, aqueous lower alcohols such as aqueous ethanol, and water. Tylosin, which exhibits inverse solubility, can be crystallized from water by dissolving it in water at a temperature of about 2° C., and by gradually warming the solution to room temperature, or slightly above, whereupon the tylosin separates in crystalline form. The dried crystals of tylosin melt at about 127–132° C.

Tylosin is soluble in slightly acidic, aqueous solutions, for example, 5 percent aqueous acetic acid. Additionally, it is soluble in most polar organic solvents, illustrative examples of which are lower ketones such as acetone, methyl ethyl ketone, and methyl isobutyl ketone, lower alcohols such as methanol and ethanol, lower esters such as ethyl acetate and ethyl formate, halogenated hydrocarbons such as methylene chloride and chloroform, ethers such as diethyl ether, nitrogen-containing organic solvents such as dimethyl formamide, pyridine and triethylamine, and heterocyclic organic solvents such as tetrahydrofuran and thiophene. It is soluble in benzene, but is relatively insoluble in nonpolar solvents of the alpihatic hydrocarbons class, for example, hexane and heptane. It is slightly soluble in water and in mildly alkaline, aqueous solutions. Solubility analysis of tylosin in water at 26° C. showed a solubility of 5.0 mg. per ml.

Tylosin is relatively stable in solution over a pH range of about pH 4 to pH 9, but is unstable in strongly acidic and strongly basic solutions. When tylosin is treated with an acid solution having a pH lower than about pH 4, it is hydrolyzed to desmycosin and mycarose, a carbohydrate which is represented by the following formula:

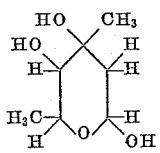

Electrometric titration of tylosin in dimeteyl formamide-water solution (2:1 parts by volume) reveals the presence of one titratable group of pK'a=7.1.

The molecular weight of tylosin, calculated from the titration data is about 900.

An average of several elemental analyses of crystalline tylosin dried in vacuo at about 80° C. over phosphorus pentoxide gave the folowing values:

| | Percent |
|---|---|
| Carbon | 59.68 |
| Hydrogen | 8.53 |
| Nitrogen | 1.55 |
| Oxygen (by difference) | 30.24 |

The above data establish an empirical formula of $C_{45}H_{77}NO_{17}$.

The infrared absorption curve of the crystalline free base in chloroform is shown as FIG. I of the accompanying drawings. The distinguishable bands in the infrared spectrum over the range of $2.0\mu$ to $15.0\mu$ are as follows: 2.85, 3.36, 3.41 (shoulders at 3.47, 3.52, and 3.58), 3.68, 5.80, 5.94, 6.27, 6.88, 7.09, 7.27, 7.36, 7.61, 7.90, 8.45, 8.62, 8.75, 8.95, 9.28, 9.53, 9.85, 10.04, 10.13, 10.40, 10.80, 11.10, 11.53, and $11.91\mu$.

The ultraviolet absorption spectrum of tylosin in water shows an intense absorption maximum at about 282 m$\mu$, with a molar extinction of $$E_{1\,cm.}^{1\%}=245$$

The specific optical rotation of crystalline tylosin dried at room temperature in vacuo over anhydrous calcium chloride for about 15 hours, is as follows: $[\alpha]_D^{25°}=-46.3°$; c.=2 percent in methanol (weight per volume).

A powder X-ray diffraction pattern of tylosin using unfiltered chromium radiation and a wave-length value of 2.2896 A. in calculating the interplanar spacings gives the following values:

| "d" | I/I₁ | "d" | I/I₁ |
|---|---|---|---|
| 7.72 | 0.40 | 3.31 | 0.08 |
| 6.50 | 1.00 | 3.19 | 0.12 |
| 6.12 | 0.40 | 3.05 | 0.02 |
| 5.74 | 0.40 | 2.97 | 0.20 |
| 5.18 | 0.40 | 2.84 | 0.02 |
| 4.71 | 0.08 | 2.74 | 0.04 |
| 4.54 | 0.16 | 2.68 | 0.04 |
| 4.37 | 0.60 | 2.47 | 0.02 |
| 4.23 | 0.02 | 2.39 | 0.04 |
| 4.12 | 0.08 | 2.33 | 0.04 |
| 3.84 | 0.12 | 2.25 | 0.04 |
| 3.68 | 0.12 | 2.14 | 0.02 |
| 3.63 | 0.12 | 2.032 | 0.02 |
| 3.47 | 0.12 | 1.908 | 0.02 |

Chemical tests made on crystalline tylosin show the presence of methoxy, hydroxy, N-methyl, and C-methyl groups.

Tylosin gives positive Molisch and anthrone tests for the presence of carbohydrate. It decolorizes permanganate solution. It gives negative results in the ninhydrin, biuret, and Sakaguchi protein tests, gives a negative ferric chloride test for phenolic groups, and gives a negative maltol test.

Structure studies on tylosin show the presence in the molecule of a mycaminose residue. Mycaminose is an amino sugar and can be represented by the following formula:

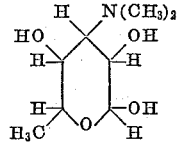

Chromatography of tylosin on Whatman No. 1 paper gives the following $R_f$ values: $R_f$=0.36 in a solvent of water containing 7 percent magnesium sulfate (weight-volume) and 2.5 percent methyl ethyl ketone (volume-volume); $R_f=0.86$ in a solvent of n-butanol saturated with water; $R_f=0.09$ in a solvent of water-saturated methyl isobutyl ketone containing 2 percent by weight of p-toluenesulfonic acid monohydrate; and $R_f=0.83$ in a solvent of methyl ethyl ketone saturated with water. In determining the foregoing values, the tylosin was applied to the paper in acetone solution.

The free base of tylosin has an inhibitory action against growth of microbial organisms including both gram-positive and gram-negative bacteria, some of which are plant pathogens. However, the preponderance of organisms against which it has inhibitory action are gram-positive. The levels at which tylosin shows inhibition against the growth of illustrative organisms are set forth in Table I. The inhibitory levels were determined by the agar-dilution test or by the broth-dilution test (identified in the table by the letters "ad" and "bd," respectively).

In the agar-dilution test, the test organism was streaked on a series of agar plates containing various concentrations of tylosin to determine the minimum concentration of tylosin base in mcg./ml. (micrograms per milliliter) in the agar substrate which inhibited the growth of the organism over a period of forty-eight hours (seventy-two hours in the case of the plant pathogen organisms).

In the broth-dilution test, a series of tubes containing nutrient broth containing varied concentrations of tylosin were inoculated with the test organism to determine the minimum concentration of tylosin in mcg./ml. in the broth substrate which inhibited organism growth for a period of about twenty hours.

The acyl derivatives of tylosin, and the acid addition salts of both tylosin and its acyl derivatives, possess in general activities of about the same value as those given in Table I, making allowances for the increased molecular weights of the acyl derivatives and the salts.

TABLE I

| Test organism | Inhibitory concentration (mcg./ml.) |
|---|---|
| BACTERIA | |
| Staphylococcus aureus | 1.56 ad. |
| Staphylococcus albus | 3.13 ad. |
| Bacillus subtilis | 1.56 ad. |
| Mycobacterium phlei | .78 ad. |
| Mycobacterium tuberculosis (607) | .78 ad. |
| Mycobacterium avium | .78 ad. |
| Escherichia coli | >100 ad. |
| Proteus vulgaris | 50 ad. |
| Pseudomonas aeruginosa | >100 ad. |
| Aerobacter aerogenes | >100 ad. |
| Klebsiella pneumoniae | 12.5 ad. |
| Salmonella enteritidis | >100 ad. |
| Shigella paradysenteriae | 100 ad. |
| Brucella bronchiseptica | 25 ad. |
| Vibrio metschnikovii | 50 ad. |
| Streptococcus pyogenes | 0.195 bd. |
| Corynebacterium diphtheriae | 0.0975 bd. |
| Diplococcus pneumoniae | 0.195 bd. |
| BACTERIAL PLANT PATHOGENS | |
| Erwinia amylovora | 100 ad. |
| Agrobacterium tumefaciens | >100 ad. |
| Xanthomonas campestris | 25 ad. |
| Xanthomonas malvaccarum | 12.5 ad. |
| Xanthomonas phaseoli | 6.25 ad. |
| Pseudomonas syringae | 25 ad. |
| Corynebacterium insidiosum | 100 ad. |
| Corynebacterium sepodonicum | |

It will be noted from the foregoing table that tylosin has a relatively broad antimicrobial activity. This activity can be demonstrated not only in vitro, but also in vivo. Thus, administration of tylosin to mice infected with various pathogenic organisms results in the prompt elimination of the infection, whether the drug is administered subcutaneously, intraperitoneally, or orally. The $ED_{50}$ of tylosin (effective dosage to protect 50 percent of the mice used as test animals) in illustrative infections is set forth in Table II.

TABLE II

| Infecting organism | Route of administration | $ED_{50}$, mg./kg. of tylosin |
|---|---|---|
| Staphylococcus aureus | Subcutaneous | 3.8 (x 2). |
| Staphylococcus aureus | Oral | 42 (x 2). |
| Diplococcus pneumoniae | Subcutaneous | 4.8 (x 2). |
| Meningopneumonitis virus | Intraperitoneal | 41.5 (x 5). |
| Streptococcus pyogenes C203 | Subcutaneous | 2.6 (x 2). |
| Streptococcus pyogenes C203 | Oral | 65 (x 2). |

In mice, the administration of tylosin is effective in overcoming infections of Spirochaeta novyi, the orally effective dose being about 31 mg./kg. of body weight, and the intraperitoneally effective dose being about 2 mg./kg. of body weight.

Desmycosin, its acyl derivatives, and its cationic salts, described hereinafter, have antimicrobial activities substantially the same as those set forth above for tylosin.

Tylosin can be produced by culturing newly found and hitherto undescribed organism strains isolated from soil samples obtained from Nongkhai, Thailand.

The organisms were isolated from the above soil samples by suspending portions of the soil samples in sterile distilled water, and by streaking the suspensions on nutrient agar. The seeded nutrient agar plates were incubated at about 25–35° C. for several days. At the end of the incubation time, colonies of the tylosin-producing organisms were transferred with a sterile platinum loop to agar slants. The agar slants were then incubated to provide suitable amounts of inoculum for the production of tylosin.

The novel organisms capable of producing tylosin have been placed on permanent deposit with The Culture Collection of the Northern Utilization Research and Development Branch of the U.S. Department of Agriculture, Peoria, Illinois, and have been assigned the culture numbers NRRL 2702 and NRRL 2703.

The newly discovered organism strains are in many respects quite similar to the species Streptomyces fradiae, a member of the order Actinomycetales, as defined in Bergey's Manual of Determinative Bacteriology, 7th Edition, page 799. Although there is some inherent uncertainty in classification of such microorganisms, it is believed that our novel organisms NRRL 2702 and NRRL 2703 can properly be classified as new strains of the species S. fradiae and that the Waksman strain of S. fradiae, obtained from the American Type Culture Collection and identified as ATCC 10745 (Waksman 3535) is the most closely related of previously known organisms. One notable difference between our novel strains and the Waksman strain of S. fradiae lies in the failure of the Waksman strain to produce either tylosin or desmycosin. The Waksman strain has been cultured in the preferred media herein described, but no detectable amount of tylosin or desmycosin has ever been observed.

This invention will be described in detail with particular reference to the newly found organism, NRRL 2702. However, it is to be understood that the production of the antibiotic by the growing of other tylosin-producing strains such as NRRL 2703, or mutants of NRRL 2702 and NRRL 2703 are within the scope of this invention. Such other organisms, strains, or mutants can be produced by known procedures, for example, by subjecting a tylosin-producing organism to X-ray or ultraviolet irradiation, or to chemical agents, for example, the nitrogen mustards.

In the following paragraphs, the results of a detailed taxonomic study of the above tylosin-producing strain of S. fradiae, NRRL 2702, are set forth. The colors used in the description are in accordance with the definitions used in Ridgway: Culture Standards and Nomenclature (1912).

MICROSCOPIC MORPHOLOGY

*Tomato paste-oatmeal agar (14 days at 30° C.).*—Spore chains are in hooks, loops, and irregular coils. Typical spirals are rarely found. Spores are sub-globose in shape and range from about $0.8\mu$ to about $1.5\mu$.

*Inorganic salts-starch agar (14 days at 30° C.).*—Microscopic morphology like that observed on tomato paste-oatmeal agar.

*Inorganic salts-ribose agar (14 days at 30° C.).*—Microscopic morphology like that observed on tomato paste-oatmeal agar.

Cultural characteristics

*Czapek's agar (14 days at 30° C.).*—Growth fair. No aerial mycelium. Reverse near Cream Color.

*Calcium malate agar (14 days at 30° C.).*—Growth moderate. Cream Buff in areas. Reverse Naples Yellow.

*Glucose-asparagine agar (14 days at 30° C.).*—Growth very scant.

*Inorganic salts-starch agar (14 days at 30° C.).*—Growth abundant. Aerial mycelium moderate, white to Pale Ochraceous Salmon. Reverse near Cream Buff.

*Tomato paste-oatmeal agar (14 days at 30° C.).*—Growth abundant. Aerial mycelium moderate, from white to Vinaceous Buff.

*Emerson's agar (14 days at 30° C.).*—Growth moderate. Aerial mycelium fair, white. Reverse near Ochraceous Buff.

*Yeast extract agar (14 days at 30° C.).*—Growth moderate. Aerial mycelium fair, white. Reverse Antimony Yellow.

*Potato plug agar (14 days at 30° C.).*—No visible growth.

PHYSIOLOGY

Gelatin liquefaction—slow
Nitrate reduction—reduces nitrates
$H_2S$ production—none
Starch hydrolysis—fair
Temperature—26° C.–30° C. growth optimum
Temperature—32° C.–37° C. sporulation optimum
No aerial mycelium produced at 26° C.

In Table III are set forth results of carbon utilization tests carried out on organism NRRL 2702. In the table, the following symbols are employed:

+ = growth and utilization
− = no growth, no utilization
± = limited growth, probably poor utilization

TABLE III

*Carbon utilization pattern for NRRL 2702*

| Compound | Growth response |
|---|---|
| L (+) Arabinose | + |
| L (+) Rhamnose | ± |
| D (+) Ribose | − |
| D (+) Xylose | + |
| D (−) Fructose | + |
| D (+) Glucose | + |
| D (+) Melibiose | + |
| Sucrose | − |
| D (+) Trehalose | + |
| D (+) Melizitose | + |
| D (+) Raffinose | − |
| Cellulose | − |
| Inulin | − |
| Adonitol | − |
| i-Inositol | − |
| Mannitol | ± |
| Sodium acetate | + |
| Salicin | − |

As noted, tylosin can be produced by cultivation of NRRL 2702 or NRRL 2703. The culture medium employed can be any one of a number of media since, as is apparent from the above-described utilization tests, the organism is capable of utilizing many energy sources. However, for economy of production, maximum yields of antibiotic, and ease of isolation of the antibiotic, certain culture media are preferable. The media which are useful in the production of tylosin include an assimilable source of carbon such as glucose, sucrose, fructose, starch, glycerine, molasses, dextrin, brown sugar, corn steep solids, and the like. The preferred sources of carbon are glucose and starch. Additionally, employable media include a source of assimilable nitrogen such as linseed meal, tankage, fish meal, cotton seed meal, oatmeal, ground wheat, soybean meal, beef extract, peptones (meat or soy), casein, amino acid mixtures, and the like. Preferred sources of nitrogen are soybean meal, casein, and corn steep solids.

Mineral salts, for example, those providing sodium, potassium, ammonium, calcium, magnesium, cobalt, sulfate, chloride, phosphate, carbonate, acetate, and nitrate ions, and a source of growth factors such as distillers' solubles and yeast extract, can be incorporated into the media with beneficial results.

As is necessary for the growth and development of other microorganisms, essential trace elements should also be included in the culture medium for growing the actinomycete employed in this invention. Such trace elements are commonly supplied as impurities incidental to the addition of the other constituents of the medium.

The initial pH of the culture medium can be varied widely. However, it has been found that the initial pH of the medium desirably is between about pH 5.5 and about pH 8.0, and preferably is between about pH 6.5 and about pH 7.0. As has been observed with other actinomycetes, the pH of the medium gradually increases throughout the growth period of the organism during which time tylosin is produced, and may attain a pH from about pH 7.2 to about pH 8.0 or above, the final pH being dependent at least in part on the initial pH of the medium, the buffers present in the medium, and the period of time the organism is permitted to grow.

Submerged, aerobic cultural conditions are the conditions of choice for the production of large amounts of tylosin. For preparation of relatively small amounts, shake flasks and surface culture in bottles can be employed, but for the preparation of large amounts, submerged aerobic culture in sterile tanks is preferred. The medium in the sterile tank can be inoculated with a sporulated suspension. However, because of the growth lag experienced when a sporulated suspension is used as the inoculum, the vegetative form of the culture is preferred to avoid the prounounced growth lag, thereby permitting a more efficient use of the fermentation equipment. Accordingly, it is desirable first to produce a vegetative inoculum of the organisms by inoculating a relatively small quantity of culture medium with the spore form of the organism, and when a young, active, vegetative inoculum has been obtained, to transfer the vegetative inoculum aseptically to the large tank. The medium in which the vegetative inoculum is produced can be the same or a different medium than that utilized for the large scale production of tylosin.

The organisms grow best at temperatures in a range of about 25° C. to about 32° C. Optimal tylosin production appears to occur at a temperature of about 26–30° C.

As is customary in submerged culture processes, sterile air is blown through the culture medium. For efficient growth of the organism and tylosin production, the volume of air employed in the tank production of tylosin preferably is upwards of 0.1 volume of air per minute per volume of culture medium. Efficient growth and optimal yields of tylosin are obtained when the volume of air used is at least one volume of air per minute per volume of culture medium.

The concentration of tylosin activity in the culture medium can readily be followed during the fermentation period by testing samples of the culture medium for their inhibitory activity against the growth of an organism known to be inhibited in the presence of tylosin. The use of the organism *Staphylococcus aureus* has been found to be very satisfactory for this purpose. The testing can be carried out by the known turbidimetric or cup-plate methods.

In general, after inoculation maximum production of tylosin occurs within about 2 to 7 days when submerged aerobic culture of shake flask culture is employed, and within about 5 to 10 days when surface culture is used.

The mycelium and undissolved solids are removed from the fermentation broth by conventional means such as filtration or centrifugation. The tylosin is removed from the filtered or centrifuged broth by employing adsorption or extraction techniques.

For the extraction of tylosin from the filtered broth, water-immiscible, polar, organic solvents are preferred, such including esters of fatty acids, for example, ethyl acetate and amyl acetate; chlorinated hydrocarbons, for example, chloroform, ethylene dichloride, and trichloroethylene; water-immiscible alcohols, for example, butyl and amyl alcohols; water-immiscible ketones, for example, methyl isobutyl ketone and methyl amyl ketone; and ethers, for example, diethyl ether and methyl propyl ether. Other solvents of similar character can also be employed. Chloroform and amyl acetate are the presently preferred extraction solvents.

For the recovery of tylosin by adsorption techniques, various adsorbants and ion exchange resins can be used, for example, carbon, silica gel, alumina, and ion exchange resins of acidic character such as "XE" 64 and "IRC" 50 (weakly acidic cation exchange resins sold by Rohm & Haas Company), carboxymethyl cellulose resin, and "Dowex" 50 (a strongly acidic cation exchange resin sold by The Dow Chemical Company). The tylosin can be adsorbed on one of the above or similar adsorbents from a solution in chloroform, acetone, benzene or other suitable solvents. The adsorbed tylosin can then be eluted from the adsorbent by suitable elution techniques such as by washing the adsorbent on which the tylosin is adsorbed, with a lower alcohol, for example, methanol or ethanol, or with a lower alcohol containing up to about 50 percent of a lower ketone, for example, acetone.

The organic solvent extract obtained by the preferred extraction method can be directly evaporated to dryness to provide crude tylosin. Alternatively the organic solvent extract can be used to provide purified tylosin by concentrating in vacuo the organic solvent extract of tylosin by decolorizing the concentrate with carbon, and by precipitating the tylosin by the addition of a nonpolar solvent, for example, petroleum ether. The precipitate which is thus obtained is a solid, purified tylosin which is usually amorphous. The amorphous precipitate can be crystallized by employing one of the crystallizing solvents mentioned above. Alternatively, tylosin can be recovered from a tylosin-containing organic extract, by adsorption chromatography, and by recovery of the adsorbed tylosin from the adsorbent by elution.

As referred to above, tylosion is converted into desmycosin by hydrolyzing tylosin with dilute acid. Severe hydrolytic conditions should be avoided to prevent the destruction of the desmycosion since this substance is sensitive to strongly acid conditions as is tylosin. Desmycosin is readily prepared by permitting an aqueous, acidic solution of tylosin to stand at room temperature for a period of time sufficient to provide substantial quantities of desmycosin as a hydrolytic product. It has been found that an excellent yield of desmycosin is provided by dissolving tylosin at a concentration of 4 percent in an acidic, aqueous solution such as in dilute aqueous hydrochloric acid, permitting the mixture to stand at room temperature for about three days, and then recovering the desmycosin from the hydrolysis mixture by neutralizing the mixture, and extracting the desmycosin with a water-immiscible solvent.

Desmycosin which has substantially the same solubility properties and antimicrobial properties as tylosin, is characterized by the following specific physical and chemical properties:

Desmycosin which has substantially the same solubility in the range of about pH 1 to about pH 9. It can be obtained in crystalline form by crystallization from crystallizing solvents such as chloroform and acetonitrile. When crystallized from chloroform, the crystals of desmycosin are blade-like in form, and are solvated with about one molecular equivalent of chloroform. The chloroform solvate crystals of the free base of desmycosin after air drying at room temperature melt at about 95–115° C. Nonsolvated, crystalline desmycosin can be obtained by heating the solvated crystals in vacuo at 75° C. for a few hours.

An electrometric titration of desmycosin in diethyl formamide-water solution (2:1 parts by volume) reveals the presence of one titratable group of $pK'a = 8.0$.

The molecular weight as determined by the titration data is about 760.

An average of several elemental anlyses of the crystalline base dried in vacuo at 80° C. over phosphorous pentoxide, gave the following values:

| | Percent |
|---|---|
| Carbon | 60.07 |
| Hydrogen | 8.50 |
| Nitrogen | 1.85 |
| Oxygen (by difference) | 29.58 |

The above data establish an empirical formula of $C_{38}H_{65}NO_{14}$.

The infrared absorption curve of the crystalline free base in chloroform solution is shown in FIG. II of the accompanying drawings. The distinguishable bands in the infrared spectrum over the range of $2.0\mu$ to $15.0\mu$ are as follows: 2.76, 2.86, 3.38, 3.43, 3.48, 3.54, 3.69, 5.80, 5.95, 6.14, 6.26, 6.87, 7.11, 7.16, 7.25, 7.37, 7.60, 7.92, 8.48, 8.59, 8.77, 8.91, 9.26, 9.45, 9.92, 10.13, 10.40, 10.75, 11.11, 11.51, and 11.95.

An ultraviolet absorption spectrum of desmycosin in water shows an intense absorption maximum of 282 m$\mu$ having a molar extinction of $$E_{1\,cm.}^{1\%} = 285$$

The specific optical rotation of the crystalline free base of desmycosin which was dried at room temperature in vacuo over anhydrous calcium chloride for about 15 hours, is: $[\alpha]_D^{25°} = -14.80°$; (c.=2 percent in methanol, weight/volume).

A powder X-ray diffraction pattern using unfiltered chromium radiation and a wave-length value of 2.2896 A. in calculating the interplanar spacings gives the following values:

| "d" | $I/I_1$ | "d" | $I/I_1$ |
|---|---|---|---|
| 13.1 | 0.20 | 4.01 | 0.20 |
| 11.6 | 0.20 | 3.77 | 0.20 |
| 10.1 | 0.20 | 3.64 | 0.13 |
| 6.88 | 0.20 | 3.51 | 0.13 |
| 6.16 | 0.50 | 3.35 | 0.27 |
| 5.62 | 0.33 | 3.09 | 0.13 |
| 5.27 | 1.00 | 2.91 | 0.13 |
| 5.03 | 0.13 | 2.76 | 0.13 |
| 4.76 | 0.13 | 2.61 | 0.13 |
| 4.39 | 0.33 | 2.37 | 0.13 |
| 4.17 | 0.13 | 2.25 | 0.03 |

Chemical tests made on desmycosin show the presence of methoxy, hydroxy, N-methyl, and C-methyl groups. It decolorizes permanganate solution, and gives a positive Molisch test for the presence of carbohydrate. It gives negative results in the minhydrin, biuret, and Sakaguchi protein tests, gives a negative ferric chloride test for phenolic groups, and gives a negative maltol test.

Chromatography of desmycosin on Whatman No. 1 paper gives the following $R_f$ values: $R_f = 0.65$ in a solvent of water containing 7 percent magnesium sulfate (by weight) and 2.5 percent methyl ethyl ketone (by volume); $R_f=0.82$ in a solvent of n-butanol saturated with water; and $R_f=0.64$ in a solvent of methyl ethyl ketone saturated with water. In determining the foregoing values, the desmycosin was applied to the paper in acetone solution.

Both tylosin and desmycosin are readily esterified to give a lower alkylcarbacyl tylosin or a lower alkylcarbacyl desmycosin respectively upon treatment with acylating agents, for example, halide and anhydrides of organic acids such as acetic, β-chloroacetic, propionic, acrylic, and like acids, and other acylating agents, for example, a mixture of the organic acid and N,N'-dicyclohexylcarbodiimide. The separation and purification of the novel acyl derivatives are effected by any of the commonly employed crystallization techniques. The acyl derivatives of tylosin and desmycosin have pK'a values which are in general substantially lower than the pK'a values of tylosin and desmycosin.

The acid addition salts of tylosin and desmycosin can be formed with mineral acids, for example, sulfuric, hydrochloric and nitric acid, and with organic acids, for example, tartaric, gluconic, oxalic and acetic acid. The acid addition salts can be prepared by dissolving the free base of tylosin or desmycosin in a solvent in which it is soluble, such as acetone or ether, and adding to the solution an equimolar amount of the appropriate acid. The salt which is formed usually precipitates out of solution. In the event the salt does not precipitate, it can be recovered by evaporating the solution to a smaller volume to permit precipitation, or by adding a miscible solvent in which the salt is not soluble. Acid addition salts of the acyl derivatives of tylosin and desmycosin can also be prepared by the above procedures.

Because of their broad antibacterial spectrum and their highly effective antimicrobial action, the novel compounds of this invention are useful in many ways as sterilizing agents, both for the sterilization of laboratory and home utensils, and food products. In their antibacterial action, the compounds are effective sporicides, and their use in food products eliminates the necessity of using high cooking temperatures and overcooking, to destroy sporulated forms of organisms.

Additionally, the compounds are useful in the veterinary field for the treatment of infections such as PPLO infections and turkey sinusitis. Effective control of sinusitis is obtained by direct injection into each infraorbital sinus of the afflicted bird of a solution containing about 5 to about 20 milligrams of tylosin, desmycosin, or an ester or acid addition salt thereof.

Moreover, the compounds can be employed as feed additives to promote weight gain with feed economy.

This invention is further illustrated by the following specific examples:

EXAMPLE 1

Preparation of tylosin

A sporulated culture of NRRL 2702 is produced by growing the organism on a nutrient agar slant having the following composition:

| | |
|---|---|
| Yeast extract _____ g___ | 1.0 |
| Beef extract _____ g___ | 1.0 |
| Hydrolyzed casein ("N-Z-Amine—Type A," sold by the Sheffield Chemical Co.) _____ g___ | 2 |
| Dextrin _____ g___ | 10 |
| Cobaltous chloride heptahydrate _____ mg___ | 20 |
| Agar _____ g___ | 20 |
| Water _____ l___ | 1 |

The pH of the medium is adjusted to pH 7.3 by the addition of sodium hydroxide.

The slant is inoculated with spores of NRRL 2702 and is incubated for five days at about 30° C. The sporulated culture growth on the slant is covered with water, and the slant is scraped gently to remove the spores to provide an aqueous spore suspension.

1 ml. of the sport suspension is used to inoculate under aseptic conditions a 100 ml. portion of a sterile vegetative culture medium having the following composition:

| | G. |
|---|---|
| Glucose _____ | 15 |
| Soybean meal_____ | 15 |
| Corn steep solids _____ | 15 |
| Sodium chloride _____ | 5 |
| Calcium carbonate _____ | 2 |
| Tap water, added to make a total of volume of 1 l. | |

The inoculated vegetative medium is incubated at about 30° C. for 48 hours, during which time the incubate is shaken at the rate of 114 cycles per minute on a reciprocal shaker having a 2-inch stroke.

5 ml. of the vegetative inoculum are used to inoculate aseptically 100 ml. portions of the following sterilized production medium contained in 500 ml. Erlenmeyer flasks:

| | | |
|---|---|---|
| Soybean meal _____ g___ | | 15 |
| Casein _____ g___ | | 1 |
| Crude glucose syrup _____ ml___ | | 20 |
| Calcium carbonate _____ g___ | | 2.5 |
| Sodium nitrate _____ g___ | | 3 |
| Tap water, added to make a total of volume of 1 l. | | |

The inoculated culture is incubated for 100 hours at about 26–28° C. During the incubation period, the incubate is shaken at 114 revolutions per minute on a reciprocal shaker having a 2-inch stroke. The pH of the starting medium is about pH 6.5, and at the end of the incubation period, the pH of the medium generally increases to about pH 5.7.

The fermented culture broth is filtered to remove the mycelium and other undissolved solids. The filtered broth contains tylosin in the amount of about 250 mcg. per ml. of broth.

EXAMPLE 2

Preparation of tylosin

A sporulated culture of the NRR 2702 is produced by growing the organism on a nutrient agar slant having the following composition.

| Tomato paste-oatmeal Agar: | G. |
|---|---|
| Tomato paste _____ | 20 |
| Pre-cooked oatmeal _____ | 20 |
| Agar _____ | 15 |
| Water, added to make a total volue of 1 l. | |

The slant is inoculated with spores of NRRL 2702 and the inoculated slant is incubated for 9 days at a temperature of about 30° C. After incubation, the sporulated culture on the slant is covered with water, and the surface of the slant is scraped gently to remove the spores to obtain an aqueous spore suspension.

Employing aseptic techniques, one-half of the inoculum obtained from one agar slant is used for inoculating a 500 ml. portion of a sterilized vegetative culture medium having the following composition contained in a 2 l. Erlenmeyer flask:

| Corn-steep yeast I: | G. |
|---|---|
| Glucose _____ | 15 |
| Corn steep solids _____ | 5 |
| Yeast _____ | 5 |
| Calcium carbonate _____ | 3 |
| Water, added to make a total volue of 1 l. | |

The incubation is carried on at 28° C. for 48 hours with shaking at 110 cycles per minute on a reciprocal shaker having a 2-inch stroke.

0.25 gal. of the vegetative inoculum from the flask is added aseptically as an inoculum to 250 gal. of the sterile corn steep yeast I medium described above contained in an iron 350 gal. fermentor. 0.025 gal. of Antifoam A (an antifoam product sold by The Dow Corning Company) is added to the culture medium to prevent excessive foaming, and additional quantities are added as needed during the fermentation. The inoculated medium is fermented for 24 hours at a temperature of 28° C. During fermentation, the medium is aerated with sterile air at a rate of 27 cubic feet per minute and is agitated with two 16-inch impellers operated at 160 revolutions per minute.

To a 1700 gal. iron fermentor are added 1200 gal. of a medium having the following composition.

Corn steep soy XII:

| | Kg. |
|---|---|
| Glucose | 30 |
| Soybean oil meal | 15 |
| Corn steep solids | 5 |
| Crude soybean oil | 10 |
| Calcium carbonate | 2 |
| Sodium chloride | 5 |

Water, added to make a total volume of 1000 l.

The medium is inoculated with 96 gal. of the inoculum grown in the fermentation tank. The fermentation is carried on at 28° C. for four days, and any foaming is controlled by the addition as needed of "Larex" No. 1 (an antifoam product sold by Swift & Company). The fermentation medium is aerated by the addition of sterile air at the rate of 128 cubic feet per minute and is agitated with two 24-inch impellers operated at 130 revolutions per minute.

600 pounds of "Silflo" (a diatomaceous earth filter aid sold by The Silflo Company) are added to the broth, and the mixture is filtered. The filtrate is adjusted to pH 8.5 by the addition of 20 percent sodium hydroxide, 500 gal. of chloroform are added, the mixture is stirred for 30 minutes, and the chloroform layer which is in the form of an emulsion is decanted. The chloroform extraction is repeated twice with 500-gal. portions of chloroform. The chloroform emulsions which contain the tylosin are combined and are passed through a De Laval separator to break the emulsion, and the chloroform solution is then concentrated in vacuo to a volume of 25 l. The impurities are largely removed from the solution by passing it over a column 6 inches in diameter containing 10 kg. of activated carbon such as that sold by the Pittsburgh Coke and Chemical Co. The carbon column is washed with 16 l. of chloroform, and the combined chloroform effluents containing the tylosin are concentrated in vacuo to a volume of about 2 l. The chloroform concentrate is added slowly with stirring to 20 l. of petroleum ether, the mixture is stirred for 15 minutes, it is filtered to remove the white, amorphous precipitate of tylosin which precipitates. The tylosin after drying in vacuo weighs about 1070 g.

The amorphous tylosin is crystallized by dissolving it in 355 ml. of acetone, filtering the acetone mixture to remove a slight haze, and slowly adding the filtered acetone mixture with gentle stirring to 20 l. of water at 5° C. The aqueous, acetone solution of tylosin is permitted to stand at room temperature with gentle stirring to permit the acetone to evaporate slowly, whereupon tylosin crystallizes out. The tylosin crystals are removed by filtration and are dried in vacuo at room temperature. They melt at about 127–132° C.

EXAMPLE 3

*Preparation of tylosin tartrate*

5 g. of crystalline tylosin are dissolved in 100 ml. of acetone, and 1.5 g. of D-tartaric acid dissolved in 20 ml. of acetone are added with stirring. The solution is permitted to stand at room temperature whereupon the tartrate salt of tylosin crystallizes out of the solution. The crystals of the tartrate salt of tylosin are removed by filtration, are washed with acetone, and are air-dried. The yield of the salt is 5.5 g. The crystalline salt melts at about 140–146° C.

EXAMPLE 4

*Preparation of tylosin gluconate*

1.03 g. glucono-delta lactone are dissolved in 10 ml. of water, and the aqueous solution is warmed to 85° C. for two hours to cause hydrolysis of the lactone to gluconic acid. 15 ml. of warm methanol are added to the aqueous solution. 5 g. of tylosin dissolved in 10 ml. of methanol are added to the methanol mixture with stirring. The tylosin methanol mixture is permitted to stand overnight at room temperature. The methanol is removed from the mixture by evaporation in vacuo at room temperature. After the methanol is removed, 40 ml. of water are added to the aqueous tylosin mixture. The diluted mixture is filtered, and the filtrate containing the tylosin is freeze-dried, yielding 5.3 g. of a white solid consisting of the gluconate salt of tylosin. The salt melts at about 114–117° C.

EXAMPLE 5

*Preparation of tylosin hydrochloride*

890 mg. of tylosin are dissolved in 200 ml. of ether. The ether mixture is acidified by the addition of 0.082 ml. of 12 N hydrochloric acid. The precipitate of the hydrochloride salt of tylosin which forms is filtered off, is washed with ether, and is dried in vacuo. The hydrochloride salt of tylosin is recrystallized from an ethanol-ether mixture. The hydrochloride salt of tylosin melts at about 141–145° C.

EXAMPLE 6

*Preparation of acetyl tylosin*

14.3 g. of tylosin are dissolved in 97 ml. of acetone containing 15.3 g. of potassium bicarbonate. 4.4 ml. of acetyl chloride in 5 ml. of acetone are added slowly with stirring to the tylosin solution during a 25-minute period. The reaction mixture, while being slowly stirred, is permitted to stand at room temperature for three hours after which time the mixture is poured over cracked ice. The mixture containing acetyl tylosin is extracted twice with 75 ml. volumes of benzene. The combined benzene extracts are slowly concentrated by evaporation causing the acetyl tylosin to crystallize out. The crystalline ester is recrystallized from benzene.

Analysis of the recrystallized acetyl tylosin has shown an acetyl content of about 8.22 percent by weight and a pK'a of about 5.1. (This, as well as the other pK'a values of compounds referred to herein, were determined by electrometric titration in a dimethylformamide-water solution, 2:1 by volume.)

EXAMPLE 7

*Preparation of the acetyl tylosin*

200 g. of tylosin are added to a combination of 467 ml. of acetic anhydride and 200 g. of fused anhydrous sodium acetate. The mixture is permitted to stand at room temperature for three days. The reaction mixture is poured over cracked ice, and the mixture is neutralized by the addition of potassium bicarbonate. The neutralized mixture is extracted with 2 l. of benzene. The benzene extract containing acetyl tylosin is washed with 5 percent potassium bicarbonate solution followed by washing three times with water. The washed benzene extract containing the acetyl tylosin is concentrated in vacuo to about 100 ml. The benzene concentrate is added to about 3 l. of petroleum ether causing the acetyl tylosin to precipitate. The precipitate is removed by filtration and is dissolved in 210 l. of chloroform. The chloroform solution is decolorized with carbon, and 10 volumes of petroleum ether are added to precipitate the acetyl tylosin. The precipitate is removed from the mixture by filtration, is dissolved in 62 l. of ethyl acetate, and the ethyl acetate solution is applied to a column of acid-washed alumina having a diameter of 13 cm. and a height of 110 cm. The alumina, on which the acetyl tylosin is adsorbed, is washed with ethyl acetate. The adsorbed acetyl tylosin is eluted with a methanol-ethyl acetate mixture (1:9 v./v.), and the eluate containing the acetyl tylosin is evaporated to dryness in vacuo. The dry residue consisting of amorphous acetyl tylosin is purified by dissolving it in hot isopropyl ether, and cooling the solution to precipitate the ester. Analysis of the purified acetyl tylosin has shown that it had an acetyl content of about 8.91 percent by weight, and a pK'a of about 5.2.

EXAMPLE 8

Preparation of desmycosin 20 g. of crystalline tylosin are suspended in 500 ml. of distilled water, and the pH of the suspension is adjusted to pH 2.8 by the dropwise addition of 12 N hydrochloric acid. The mixture is permitted to stand at room temperature for three days after which the pH of the mixture is adjusted to pH 8.5 by the addition of solid sodium carbonate. The alkaline mixture is extracted four times with 100 ml. portions of chloroform. The combined chloroform extracts are washed twice with 250 ml. portions of distilled water. The washes are discarded, and the washed extract of desmycosin is evaporated to dryness in vacuo. The dry residue consisting of desmycosin is dissolved in 75 ml. of chloroform, and the chloroform solution is filtered to remove a small amount of insoluble material which is discarded. The filtrate containing the desmycosin is concentrated in vacuo to about 40 ml., and is cooled to a temperature of about 5° C. whereupon the desmycosin crystallizes out. The crystals of desmycosin are removed by filtration and are dried, providing a yield of 18.3 g. of crystalline desmycosin. The crystalline preparation of desmycosin is solvated with about a molecular equivalent of chloroform.

The chloroform solvate crystals of desmycosin can be recrystallized from chloroform or, alternatively, from acetonitrile. The chloroform solvate crystals melt at about 95–115° C.

The solvated crystals of desmycosin when heated to about 75° C. in vacuo for two hours, lose the chloroform, leaving nonsolvated, crystalline desmycosin. The nonsolvated crystals melt at about 114–116° C.

EXAMPLE 9

Preparation of desmycosin

To 5 g. of tylosin are added 100 ml. of 0.1 N hydrochloric acid, and the mixture is heated to 40° C. for one hour during which time the tylosin is converted to desmycosin. The mixture is made slightly alkaline by the slow addition of 10 percent sodium hydroxide solution. The desmycosin is isolated and purified by the procedure described in Example 8.

EXAMPLE 10

Preparation of the propionyl tylosin 2.5 g. of crystalline tylosin and 0.55 g. of N,N'-dicyclohexylcarbodiimide are dissolved in 40 ml. of dichloromethane. 0.4 g. of propionic acid are added with stirring to the tylosin solution, and the reaction mixture is permitted to stand for 20 hours. After the reaction period, the mixture is filtered to remove a precipitate which appears. The precipitate is discarded. The filtrate is washed sequentially twice with 20 ml. of 5 percent aqueous sodium bicarbonate solution and twice with 20 ml. portions of water. The washed filtrate is dried with anhydrous magnesium sulfate, is filtered, and is evaporated to dryness. The dried residue consisting of the propionyl ester of tylosin is dissolved in 20 ml. of hot acetone, the solution is cooled to about 5° C., and is filtered. The filtered acetone solution containing the propionyl tylosin is evaporated to dryness in vacuo yielding propionyl tylosin, which melts at about 124–141° C. It has a pK'a of about 5.2.

EXAMPLE 11

Preparation of acetyl desmycosin 1.9 g. of desmycosin and 0.55 g. of N,N'-discyclohexylcarbodiimide are dissolved in 40 ml. of dichloromethane. 0.3 g. of acetic acid are added with stirring to the descycosin solution, and the reaction mixture is permitted to stand for six hours. The reaction mixture is worked up following the procedure described in Example 10. The product consisting of acetyl desmycosin melts at about 97–127° C. It has a pK'a of about 6.3.

EXAMPLE 12

Preparation of propionyl desmycosin

The propionyl ester of desmycosin is prepared by the reaction of propionic acid with desmycosin following the procedure described in Example 11. Propionyl desmycosin melts at about 115–127° C. It has a pK'a of about 6.3.

EXAMPLE 13

Preparation of desmycosin hydrochloride 1 g. of desmycosin is dissolved in 200 ml. of ether. To the ether solution, 0.11 ml. of 12 N hydrochloric acid are added slowly with stirring. The white precipitate of the hydrochloride salt of desmycosin which separates is removed by filtration, is washed twice with ether, and is dried in vacuo. The hydrochloride salt of desmycosin melts at about 140–153° C. It has a pK'a of about 8.

EXAMPLE 14

Preparation of desmycosin bisulfate 2 g. of desmycosin are dissolved in 200 ml. of ether, and 0.08 ml. of 36 N sulfuric acid are added slowly with stirring to the ether mixture. The white precipitate of the bisulfate salt of desmycosin which separates is removed by filtration, is washed twice with ether, and is dried in vacuo. The bisulfate salt of desmycosin melts at about 142–159° C. It has two pK'a values of about 5.4 and about 8.0.

EXAMPLE 15

Preparation of desmycosin tartrate 1 g. of desmycosin is dissolved in 50 ml. of ether, and 0.2 g. of D-tartaric acid in 100 ml. of ether are added slowly with stirring. The white precipitate of the tartrate salt of desmycosin which separates is removed by filtration, is washed twice with ether, and is dried in vacuo. The tartrate salt melts at about 122–136° C. It has three pK'a values of about 5.35, 6.85, and 8.0.

EXAMPLE 16

Preparation of acetyl tylosin hydrochloride 900 mg. of the acetyl tylosin are dissolved in 200 ml. of ether. 0.075 ml. of 12 N hydrochloric acid are added to the ether solution slowly with stirring. The precipitate of the hydrochloride salt of the acetyl ester of tylosin which separates is removed by centrifugation, is washed with ether, and is dried in vacuo. The hydrochloride salt of the acetyl tylosin has a pK'a of about 8.0. It melts at about 122–134° C.

EXAMPLE 17

Preparation of acetyl desmycosin hydrochloride 100 mg. of acetyl desmycosin are dissolved in 20 ml. of ether, and 0.1 ml. of 12 N hydrochloric acid is added with stirring to the ether mixture. The white precipitate consisting of the hydrochloride salt of acetyl desmycosin which forms is removed by centrifugation, is washed twice with ether, and is dried in vacuo. The hydrochloride salt of the acetyl ester of desmycosin melts at about 146–150°

C. It has a pK'a of about 6.2. It is soluble in water, but is relatively insoluble in ether.

EXAMPLE 18

*Preparation of propionyl desmycosin hydrochloride*

The hydrochloride salt of the propionyl ester of desmycosin is prepared by following the procedure described in Example 17 except that the starting material is propionyl desmycosin. The hydrochloride salt of propionyl desmycosin melts at about 146–150° C. It has a pK'a of about 6.2. It is soluble in water, but is substantially insoluble in ether.

EXAMPLE 19

*Preparation of tylosin lactate*

To a solution of 7 g. of tylosin dissolved in 70 ml. of acetone, are added with stirring 10 ml. of a 50 percent by weight aqueous solution of lactic acid. n-Heptane is added with stirring to the tylosin solution to incipient turbidity. The mixture is then permitted to stand at room temperature overnight whereupon the crystalline lactate salt of tylosin precipitates. The tylosin lactate is removed by filtration, is washed with n-heptane, and is dried in vacuo at 55° C. for about four hours. It melts at about 139–141° C.

We claim:

1. A method of producing tylosin which comprises cultivating a tylosin-producing organism selected from the group consisting of *Streptomyces fradiae* NRRL 2702 and *Streptomyces fradiae* NRRL 2703 in a culture medium containing assimilable sources of carbon, nitrogen and inorganic salts, under submerged aerobic conditions until a substantial amount of tylosin is produced by said organism in said culture medium.

2. A method according to claim 1 in which the organism is *Streptomyces fradiae* NRRL 2702.

3. A method according to claim 1 in which the organism is *Streptomyces fradiae* NRRL 2703.

4. A method according to claim 1 in which the culture medium is maintained at a temperature of about 25–32° C., and the growth of the organism is carried out for a period of about two to five days.

5. A method of producing tylosin which comprises cultivating a tylosin-producing organism selected from the group consisting of *Streptomyces fradiae* NRRL 2702 and *Streptomyces fradiae* NRRL 2703 in a culture medium containing assimilable sources of carbon, nitrogen and inorganic salts, under submerged aerobic conditions until a substantial amount of tylosin is produced by said organism in said culture medium, and recovering the tylosin from said culture medium.

6. A compound selected from the group consisting of tylosin, desmycosin, and acid addition salts thereof, said tylosin being characterized as a white, solid substance, soluble in acidic aqueous solution and in most polar solvents, being substantially insoluble in most nonpolar organic solvents and in alkaline aqueous solutions, being stable in aqueous solution at a pH in the range of about pH 4 to about pH 9, having a molecular weight of about 900, having shown upon analysis the presence of 59.68 percent carbon, 8.53 percent hydrogen, 1.55 percent nitrogen, and by difference 30.24 percent oxygen, the said analytical values establishing the empirical formula $$C_{45}H_{77}NO_{17}$$

having an ionizable group with a pK'a value of 7.1 as determined by electrometric titration in two parts by volume of dimethyl formamide and one part by volume of water, having in chloroform solution spectral absorption maxima in the infrared region over the range of 2 to 15 microns at about the following wave lengths expressed in microns: 2.85, 3.36, 3.41 (shoulders at 3.47, 3.52, and 3.58), 3.68, 5.80, 5.94, 6.27, 6.88, 7.09, 7.27, 7.36, 7.61, 7.90, 8.45, 8.62, 8.75, 8.95, 9.28, 9.53, 9.85, 10.04, 10.13, 10.40, 10.80, 11.10, 11.53, and 11.91, having a spectral absorption maximum in water solution in the ultraviolet region at about 282 mμ with an

value of 245, having an optical rotation in methanol of $[\alpha]_D^{25} = -46.3°$ (c.=2), and showing a positive Molisch carbohydrate test but a negative ninhydrin test; and said desmycosin being characterized as a white, solid substance, soluble in acidic aqueous solutions and in most polar solvents, being substantially insoluble in most nonpolar organic solvents and in alkaline aqueous solutions, being stable in aqueous solution at a pH in the range of about pH 1 to about pH 9, having a molecular weight of about 760, having shown upon analysis the presence of 60.07 percent carbon, 8.50 percent hydrogen, 1.85 percent nitrogen, and by difference 29.58 percent oxygen, the said values establishing the empirical formula $C_{38}H_{65}NO_{14}$, having an ionizable group with a pK'a value of 8.0 as determined by electrometric titration in two parts by volume of dimethyl formamide and one part by volume of water, having spectral absorption maxima in chloroform solution in the infrared region over the range of 2 to 15 microns at about the following wave lengths expressed in microns: 2.76, 2.86, 3.38, 3.43, 3.48, 3.54, 3.69, 5.80, 5.95, 6.14, 6.26, 6.87, 7.11, 7.16, 7.25, 7.37, 7.60, 7.92, 8.48, 8.59, 8.77, 8.91, 9.26, 9.45, 9.92, 10.13, 10.40, 10.75, 11.11, 11.51, and 11.95, having a spectral absorption maximum in water solution in the ultraviolet region at about 282 mμ with an

value of 285, having an optical rotation in methanol solution of $[\alpha]_D^{25} = -14.80°$ (c.=2), and showing a positive Molisch carbohydrate test but a negative ninhydrin test.

7. The compound, tylosin, as set forth in claim 6.

8. The compound, desmycosin, as set forth in claim 6.

9. An acid addition salt of tylosin, as set forth in claim 6.

10. An acid addition salt of desmycosin, as set forth in claim 6.

11. The method of preparing desmycosin which comprises hydrolyzing tylosin as characterized in claim 6 with dilute acid causing hydrolysis of tylosin to provide desmycosin as characterized in claim 6.

12. The method according to claim 11 in which the acid employed is hydrochloric acid.

13. A compound selected from the group consisting of the lower alkylcarbacyl esters of tylosin and the acid addition salts thereof, said alkylcarbacyl esters of tylosin being prepared by the esterification of tylosin with an acylating agent.

14. A compound selected from the group consisting of the lower alkylcarbacyl esters of desmycosin and the acid addition salts thereof, said alkylcarbacyl esters of desmycosing being prepared by the esterification of desmycosin with an acylating agent.

References Cited in the file of this patent

Murai et al.: Antibiotics and Chemotherapy, pages 485–490, August 1959.

UNITED STATES PATENT OFFICE
CERTIFICATE OF CORRECTION

Patent No. 3,178,341                        April 13, 1965

Robert L. Hamill et al.

It is hereby certified that error appears in the above numbered patent requiring correction and that the said Letters Patent should read as corrected below.

Column 1, line 12, for "aplication" read -- application --; column 8, line 5, strike out "Desmycosin which has substantially the same solubility" and insert instead -- Desmycosin is a white solid which is stable in solution --; column 10, line 35, for "5.7" read -- 7.5 --; line 43, for "NRR 2702" read -- NRRL 2702 --; line 51, for "volue" read -- volume --; column 13, line 12, for "pk′a" read -- pK′a --; column 15, line 45, for "Streptomyces fradiate", in italics, read -- Streptomyces fradiae --, in italics; column 16, lines 62 and 63, for desmycosing" read -- desmycosin --.

Signed and sealed this 5th day of October 1965.

(SEAL)
Attest:

ERNEST W. SWIDER                              EDWARD J. BRENNER
Attesting Officer                                 Commissioner of Patents